Figure 1:
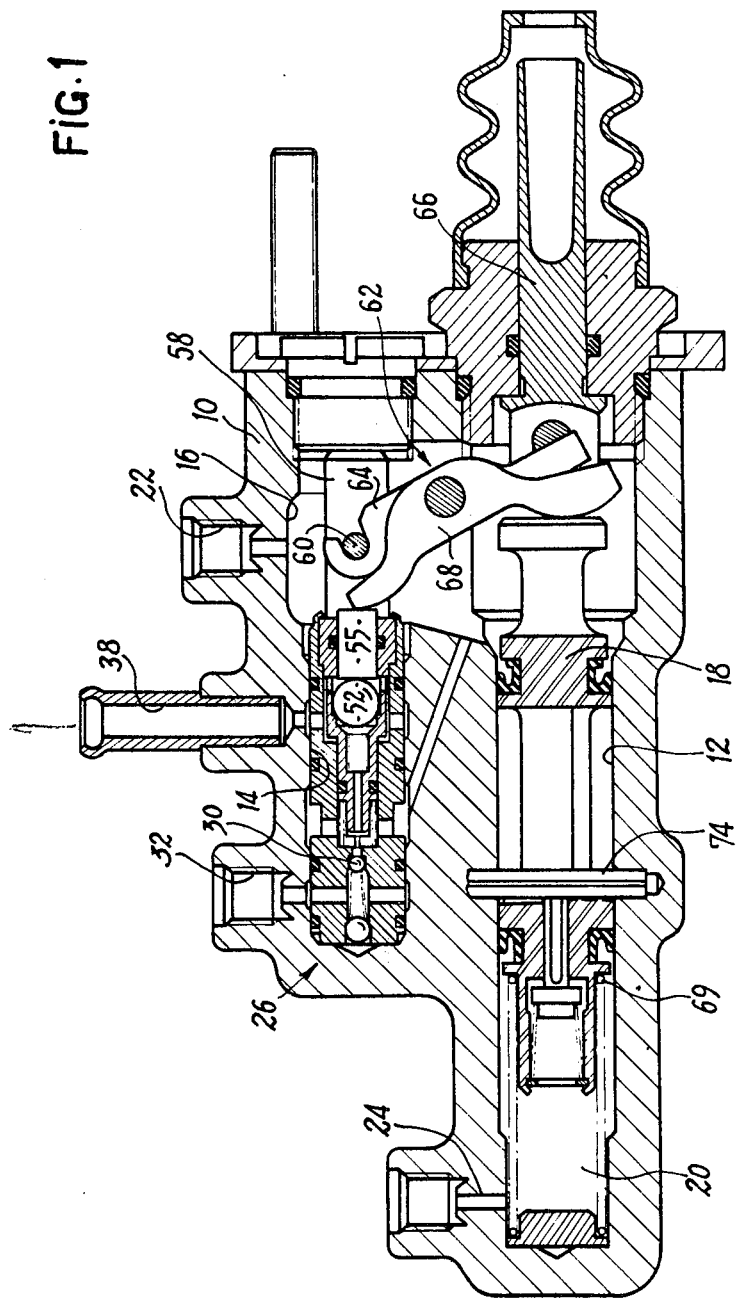

United States Patent [19]

Kervagoret

[11] 4,117,766
[45] Oct. 3, 1978

[54] HYDRAULIC BOOSTER

[75] Inventor: Gilbert Kervagoret, Argenteuil, France

[73] Assignee: Societe Anonyme D.B.A., Paris, France

[21] Appl. No.: 732,613

[22] Filed: Oct. 15, 1976

[30] Foreign Application Priority Data

Nov. 21, 1975 [FR] France .................................. 75 35602

[51] Int. Cl.² ...................... F15B 11/08; F15B 13/04; F15B 13/10
[52] U.S. Cl. ..................................... 91/457; 91/391 R
[58] Field of Search ..................... 91/391 R, 434, 370, 91/371, 372, 373, 457

[56] References Cited

U.S. PATENT DOCUMENTS

| 2,976,849 | 3/1961 | Stelzer | 91/373 |
| 3,633,363 | 1/1972 | Larsen | 91/6 |
| 3,639,008 | 2/1972 | MacDuff | 91/391 R |
| 3,834,277 | 9/1974 | Yabuta et al. | 91/391 R |
| 3,926,093 | 12/1975 | Nakagawa | 91/391 R |

*Primary Examiner*—Paul E. Maslousky
*Attorney, Agent, or Firm*—Paul David Schoenle; Ken C. Decker

[57] ABSTRACT

The invention relates to a hydraulic booster of the closed-center type and comprising a housing containing a working chamber, an actuating piston slidable in the working chamber, a set of a high-pressure valve and an exhaust valve of the ball valve type controlling fluid connections between an accumulator, the working chamber and an exhaust orifice. The high-pressure valve is controlled by a tappet including a sleeve having a central passage therein communicating with the working chamber and the exhaust orifice. The exhaust valve controls the fluid flow through the central passage. Both valves are actuated by movement of a sliding block adapted to engage the exhaust valve member.

1 Claim, 2 Drawing Figures

HYDRAULIC BOOSTER

The invention relates essentially to a hydraulic booster used for example in a power-assisted brake circuit for a motor vehicle.

U.S. Pat. No. 3,633,363 describes a hydraulic booster comprising a housing containing a working chamber, an actuating piston slidable in the working chamber, a set of control valves comprising a high-pressure valve and an exhaust valve, the high-pressure valve being a ball valve and situated between a high-pressure orifice connected to a pressure fluid accumulator and an inlet compartment connected to the working chamber, tappet means projecting into the working chamber, said tappet means controlling the ball valve under the influence of a lever mechanism according to the relative positions of the actuating piston and of a control rod projecting into the working chamber, the tappet means supporting the exhaust valve which controls the connection between the working chamber and an exhaust compartment, the arrangement being such that the exhaust valve is moved into its closed position before the ball valve opens.

In this arrangement the tappet means consists essentially of a spool. This has various disadvantages, including a high cost of manufacture, lack of stability when vibrated during operation, and relatively rapid wear on the bearings of the spool. An object of the invention is to overcome these disadvantages.

The invention proposes a hydraulic booster of the closed-center type comprising a housing containing a working chamber, an actuating piston slidable in the working chamber, a set of control valves comprising a high-pressure valve and an exhaust valve, the high pressure valve being a ball valve having a seat and a ball valve member, said ball valve being situated between a high-pressure orifice adapted to be connected in use to a pressure fluid accumulator and an inlet compartment connected to the working chamber, tappet means projecting into the working member, said tappet means controlling the ball valve under the influence of a lever mechanism according to the relative positions of the actuating piston and of a control rod projecting into the working chamber, the tappet means supporting the exhaust valve, said exhaust valve controlling the connection between the working chamber and an exhaust compartment, said exhaust valve being moved into its closed position before the ball valve opens upon actuation of said control rod, said tappet means comprising a sleeve having a central passage therein and being mounted in a fluid-tight manner across a wall separating the inlet compartment from the exhaust compartment, a valve element situated in the exhaust compartment and cooperating with a seat on the sleeve at the opening of the central passage so as to form the exhaust valve, and a sliding block which is mounted in a fluid-tight manner in a wall separating the exhaust compartment from the working member and said block cooperates with the valve element and lever mechanism respectively.

In a preferred embodiment of the invention, the effective cross-section S2 of the sleeve equals the effective cross-section S4 of the exhaust valve seat, which in turn equals the sum of the effective cross-sections S3 of the sliding block and S1 of the seat of the ball valve. Such a feature prevents the movable assembly consisting of the ball valve and the tappet means from responding to the pressure variations in the working chamber when the hydraulic booster is operating. The pressure exerted on the surface of the ball adjoining the inlet compartment is compensated hydraulically, as explained in detail in the ensuing description.

Figure 2:
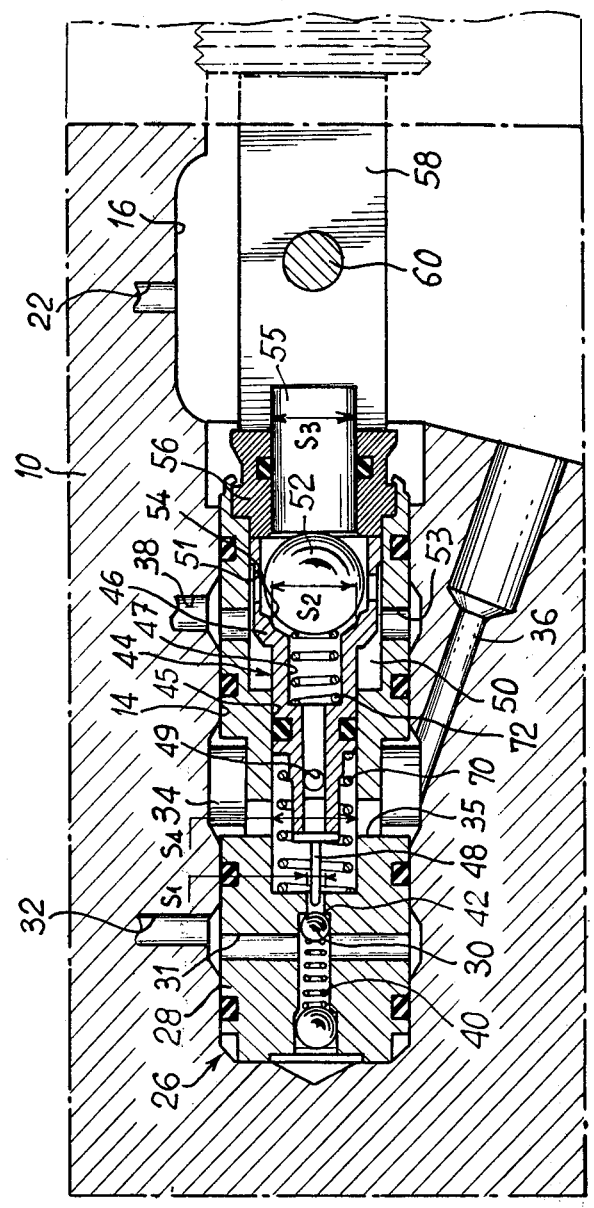

The invention will now be described with reference to the accompanying drawings, in which:

FIG. 1 is a diagrammatic illustration of a power-assisted brake system for a vehicle, comprising a hydraulic booster embodying the invention and shown in section; and FIG. 2 is a partial section, on a larger scale, of the hydraulic booster shown in FIG. 1, showing the set of control valves in detail.

The hydraulic booster shown in FIG. 1 comprises a housing 10 containing two parallel bores 12, 14 which give on to a chamber 16, termed the working chamber. A piston 18 mounted in the bore 12 separates the working chamber 16 from a utilization chamber 20 situated at the closed end of the bore 12. The chambers 16, 20 are connectible to two independent sets of brakes in the vehicle by orifices 22, 24 respectively. Pressurization of the chamber 16 is effected by a set of control valves 26 shown in detail and on a larger scale in FIG. 2. To facilitate construction the valve set 26 comprises a casing 28 mounted in the bore 14 in a fluid-tight manner and cooperating with this bore to define three zones, of which the first is connected by a high-pressure orifice 32 to a hydraulic pressure fluid accumulator, the second, termed the inlet compartment 34, is connected directly to the chamber 16 by a passage 36, and the third is connected by an exhaust orifice 38 to a low-pressure reservoir. The casing contains an axial bore 45 comprising portions of various diameters and housing the two valves. A high pressure ball valve 30 associated with the high-pressure orifice 32 is biased by a spring 40 supported against a plug on to a seat 42 of which the cross-section S1 is relatively small. The casing has a plurality of radial passages 31, 35 enabling pressure fluid to flow from the high-pressure orifice 32 into the passage 36 when the ball 30 is off its seat 42. The movements of the ball 30 are controlled by tappet means 44 comprising a sleeve slidable in a fluid-tight manner in a portion of the bore 45 in the casing 28. This bore portion has the effective cross-section S2. The sleeve 46 contains a stepped central passage 47 and an end 48 which adjoins the inlet compartment 34 and projects through the seat 42. The other end of the sleeve 46 projects into an exhaust compartment 50, communicating in turn with the exhaust orifice 38 by passages 51, 53 provided in the casing 28, and comprises an exhaust valve in the form of a ball 52 capable of bearing in a fluid-tight manner on a seat 54 of effective cross-section S4 situated at the mouth of the central passage 47. The ball 52 is moved by a sliding block 55 projecting in a fluid-tight manner through an aperture in a plug 56 which is attached to the casing 28 and which separates the exhaust compartment 50 from the working chamber 16. The sliding block 55 has the effective cross-section S3. The sleeve 46 contains radial apertures 49 giving on to its central passage 47, so that when the ball 52 is off its seat fluid can flow freely between the passages 36 and the exhaust orifice 38.

The plug 56 is attached to a U-shaped member 58 of which only one arm is shown, and which bears a pivot pin 60 capable of receiving one end of a lever mechanism 62. This mechanism consists mainly of a first lever 64 moved by the vehicle driver's pedal by way of an inlet rod 66 projecting into the chamber 16, and a double sensor 68 pivoted on the lever 64 and having one end bearing on the sliding block 55 and the other bearing on the actuating piston 18. The booster contains a plurality of return springs, in particular a spring 69 for the piston 18, a spring 70 for the sleeve 46 and a spring 72 for the ball 52. These springs enable the various components to occupy the idle position illustrated in the two Figures. In this idle position, as FIG. 1 shows, a central replenishing valve 69 provided in the left-hand portion of the piston 18 occupies an open position and communicates with an annular compartment connected in turn to the exhaust orifice 38 by a slotted tube 74. Also, the working chamber 16 communicates with the exhaust orifice 38 by way of the passage 36 and compartments 34 and 50, so that the two independent sets of brakes in the vehicle can communicate with the low-pressure reservoir when the booster is idle.

Details of the design of the lever mechanism 62 and of the corresponding operation of the hydraulic booster are given in U.S. Pat. No. 3,805,671. The operation of the booster embodying the invention will therefore not be described in full. When the driver of the vehicle depresses his brake pedal, the motions of the lever mechanism 62 are transmitted to the sliding block 55 which moves to the left in FIG. 2, first cutting off the passage 36 from the exhaust orifice 38 due to contact between the ball 52 and its seat 54, and then connecting the high-pressure orifice 32 to the passage 36 by lifting the ball 30 off its seat 42. The two valves 30, 52 therefore play a role similar to that of the spool valve described and illustrated in U.S. Pat. No. 3,805,671.

It should be noted also that the dimensions of the valve seats and of the effective area of the sliding block 55 are such that the effective cross-section S2 of the sleeve 46 equals the cross-section S4 of the seat 54, which in turn equals the sum of the effective cross-sections S3 of the sliding block and S1 of the seat for the ball valve 30. The object of the feature is to render the force F which must be exerted on the sliding block 55 in order to lift the ball 30 off its seat 42 invariable in spite of the pressure rise in the working chamber 16. The forces resulting from the pressure prevailing in the chamber 16 and inlet compartment 34 and exerted on the sleeve 46, ball 52 and sliding block 55 are compensated, so that the force F substantially equals the sum of the force exerted on the ball 30 by the high pressure prevailing in the inlet orifice 32 and the forces created by the springs 40, 70, seeing that the pressure at the exhaust orifice 38 is substantially equal to atmospheric pressure.

The hydraulic booster just described has various advantages over hydraulic boosters of the type having a spool control valve, in particular ease of manufacture, a low cost price, and increased reliability due to the elimination of the spool, which suffers relatively rapid wear. Also, the set of ball-type control valves makes it possible to maintain a high pressure in the accumulator for considerably longer than in a booster with a single spool when the vehicle is stationary. Moreover, specific selection of the cross-sections of the diameters of the various components of the ball-type control valve set prevents the valve set from responding to pressure variations in the working chamber 16 and thereby makes a hydraulic booster embodying the invention more reliable in operation.

I claim:

1. A hydraulic booster of the closed-center type comprising a housing containing a working chamber, an actuating piston slidable in the working chamber, a set of control valves comprising a high-pressure valve and an exhaust valve, the high-pressure valve being a ball valve having a seat and a ball valve member, said ball valve being situated between a high-pressure orifice adapted to be connected in use to a pressure fluid accumulator and an inlet compartment connected to the working chamber, tappet means controlling the ball valve under the influence of a lever mechanism according to the relative positions of the actuating piston and of a control rod projecting into the working chamber, the tappet means supporting the exhaust valve, said exhaust valve controlling the connection between the working chamber and an exhaust compartment, said exhaust valve being moved into its closed position before the ball valve opens upon actuation of said control rod, said tappet means comprising a sleeve having a central passage therein and being mounted in a fluid-tight manner across a wall separating the inlet compartment from the exhaust compartment, a valve element situated in the exhaust compartment and cooperating with a seat on the sleeve at the opening of the central passage so as to form the exhaust valve, and a sliding block which is mounted in a fluid-tight manner in a wall separating the exhaust compartment from the working chamber and said block cooperates with the valve element and lever mechanism respectively, said sleeve, exhaust valve seat, sliding block and ball valve seat having effective cross sections, said sleeve effective cross section being equal to said exhaust valve seat effective cross section which is equal to the sum of said sliding block effective cross section and said ball valve seat effective cross section.

* * * * *